(12) United States Patent
Stock

(10) Patent No.: US 7,343,257 B2
(45) Date of Patent: Mar. 11, 2008

(54) METHOD AND SYSTEM FOR DEVICE-INDEPENDENT DETERMINATION OF COORDINATES OF A POINT DISPLAYED BY MEANS OF A MICROSCOPE

(75) Inventor: Bernd Stock, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 100 days.

(21) Appl. No.: 10/568,001

(22) PCT Filed: Aug. 4, 2004

(86) PCT No.: PCT/EP2004/008742

§ 371 (c)(1),
(2), (4) Date: Feb. 10, 2006

(87) PCT Pub. No.: WO2005/017597

PCT Pub. Date: Feb. 24, 2005

(65) Prior Publication Data

US 2006/0279746 A1    Dec. 14, 2006

(30) Foreign Application Priority Data

Aug. 11, 2003    (DE) .............................. 103 36 803

(51) Int. Cl.
*G06F 19/00*    (2006.01)
*G06B 11/14*    (2006.01)
*G06K 9/32*    (2006.01)
(52) U.S. Cl. .................. 702/95; 356/615; 382/293
(58) Field of Classification Search .................. 702/95, 702/85; 356/247, 248, 614, 615, 622; 250/252.1; 382/276–278, 128, 291, 293, 295
See application file for complete search history.

(56) References Cited

U.S. PATENT DOCUMENTS

| 4,557,599 A | 12/1985 | Zimring .................... 356/243.1 |
| 4,807,979 A | 2/1989 | Saccomanno et al. ...... 359/368 |
| 4,907,158 A * | 3/1990 | Kettler et al. ................. 700/58 |

(Continued)

FOREIGN PATENT DOCUMENTS

WO    WO 02/37158    5/2002

OTHER PUBLICATIONS

R. C. Leif et al.: "A DICOM Compatible Format for Analytical Cytology Data", SPIE Proceedings—Optical Diagnostics of Living Cells II, vol. 3260, Jan. 25, 1998, pp. 282-289, XP002304007.

(Continued)

*Primary Examiner*—John Barlow
*Assistant Examiner*—Toan M. Le
(74) *Attorney, Agent, or Firm*—Darby & Darby

(57) ABSTRACT

A method for non-instrument-dependent determination of coordinates of a point imaged using a microscope includes determining, at object-related reference coordinates of at least one imaged reference point in a DICOM coordinate system, corresponding first instrument coordinates of the at least one imaged reference point in an instrument-dependent coordinate system. Using the object-related reference coordinates and the corresponding fast instrument coordinates, a transformation rule convening instrument-dependent coordinates into corresponding coordinates of the DICOM coordinate system is determined. Then, using the transformation rule, second instrument coordinates of an imaged point are converted into non-instrument-dependent coordinates of the DICOM coordinate system.

14 Claims, 3 Drawing Sheets

U.S. PATENT DOCUMENTS

| | | | | |
|---|---|---|---|---|
| 5,000,554 | A | | 3/1991 | Gibbs .......................... 359/393 |
| 5,367,401 | A | | 11/1994 | Saulietis ...................... 359/398 |
| 5,581,487 | A | * | 12/1996 | Kelly et al. .................... 702/85 |
| 5,644,512 | A | * | 7/1997 | Chernoff et al. .............. 702/85 |
| 5,875,258 | A | * | 2/1999 | Ortyn et al. ................. 382/133 |
| 7,027,628 | B1 | * | 4/2006 | Gagnon et al. ............. 382/128 |

OTHER PUBLICATIONS

"Digital Imaging and Communicatios in Medicine (DICOM)", Supplement 15: Visible Light Image for Endoscopy, Microscopy, and Photography, DICOM Standards Committee, Working Group 13, Rosslyn, Virginia, Final Text Jul. 2, 1999, pp. 1-17.

International Search Report for PCT/EP2004/008742 (3 pages).

* cited by examiner

METHOD AND SYSTEM FOR DEVICE-INDEPENDENT DETERMINATION OF COORDINATES OF A POINT DISPLAYED BY MEANS OF A MICROSCOPE

The present invention relates to a method and a system for the non-instrument-dependent determination of the coordinates of a point imaged using a microscope, and a calibration slide for use therefor.

BACKGROUND

Microscopes are frequently used for detecting small structures which cannot be made out with the naked eye and for discovering characteristic features in such structures. A fundamental use for microscopy in cytology, histology and pathology is for reviewing a specimen and looking for structures, cells or combinations of cells and the like which are of interest. If the sites of these structures are found on the specimen, it is desirable to note them, for a variety of reasons. For example, the structure found has to be located again at a later stage by the same or a different user for checking, for further inspection or for quality control. For this purpose, many microscopes have a unit for determining the coordinates of positions of a point in an instrument-dependent system of coordinates. By electromechanically determining these coordinates, it is possible to return to the location discovered at a later stage.

As a rule, however, the coordinates are instrument-dependent, i.e. the coordinates for this instrument can only be accurately reproduced if no changes have been made to the adjustment of the microscope and no tolerances were present. However, if for example the microscope stage is taken away for repair and reinstalled, it will give different coordinates for the same location on the specimen from those originally determined. Moreover, the coordinate systems of different microscopes, even of the same type, are not (exactly) the same.

SUMMARY OF THE INVENTION

There is a need to provide interoperability between any two microscopes, so that, for example, a second user can access, on his system, areas on a specimen which a first user has identified and stored.

The present invention provides a method and system according to the invention for non-instrument-dependent determination of coordinates of a point imaged using a microscope. The method according to the invention envisages that first of all, at given object-related reference coordinates $(X_1, Y_1, Z_1)$ of at least one reference point $E_1$ in a DICOM coordinate system, the relevant instrument coordinates $(x_1, y_1, z_1)$ of the minimum of one imaged reference point $E_1$ in an instrument-dependent coordinate system are determined and from them a transformation rule $\Phi$ for converting instrument-dependent coordinates $(x, y, z)$ into the coordinates $(X, Y, Z)$ of the DICOM coordinate system is obtained. Then, for non-instrument-dependent coordinate determination, the instrument coordinates $(x_p, y_p, z_p)$ of an imaged point P are converted by means of the transformation rule $\Phi$ discovered into non-instrument-dependent coordinates $(X_p, Y_p, Z_p)$ of the DICOM coordinate system.

The "Digital Imaging and Communications in Medicine" (DICOM) standard was developed for formatting and exchanging images of medical equipment and integrated in this equipment. DICOM is known, inter alia, in the USA, Europe and Japan. On 2nd Jul. 1999 in Virginia, USA, in Supplement 15, the DICOM Committee laid down a standard for images obtained with visible light in endoscopy, microscopy and photography (Supplement 15: Visible Light Image for Endoscopy, Microscopy and Photography). With the present invention, this purely specimen-related and therefore non-instrument-dependent DICOM coordinate system can be implemented on any microscope. The technical solution of the procedure according to the invention comprises two steps. First of all, the microscope coordinate system is calibrated so as to obtain a transformation rule for converting instrument-dependent coordinates into non-instrument-dependent coordinates of the DICOM coordinate system. After this calibration step, the coordinates of any imaged point can be transformed using this transformation rule into non-instrument-dependent coordinates of the DICOM coordinate system. These latter coordinates can then be re-accessed at a later stage or by a different user, even on a different microscope, although obviously the other equipment must contain a calibration facility for the DICOM coordinate system.

For the calibration step, in a particularly advantageous embodiment, a calibration slide is used for setting reference coordinates of the minimum of one reference point E1. This calibration slide has calibration crosses on it, marking the set reference points, in accordance with the provisions of the DICOM standard.

In order to be able to give optimum consideration to all transformations in question in the (x, y) plane, namely translation, rotation and scaling, mathematically at least 2.5 reference points or calibration crosses are needed on the calibration slide. Additional points may be needed if calibration is also to be carried out in direction z.

As certain types of slides are used in microscopy, it is advantageous to produce a corresponding calibration slide for each type of slide and to use it for the process according to the invention.

For calibration purposes, three calibration crosses corresponding to reference points $E_1$, $E_2$ and $E_3$, for example, are provided on a calibration slide. The (X, Y, Z) coordinates of these reference or calibration points $E_1$ to $E_3$ are fixed. They relate to the zero point of the DICOM coordinate system, which may be located at an outer corner of the slide.

The calibration points $E_1$ to $E_n$ ($n \geq 1$) are selected using the microscope stage and the respective $(x_1, y_1, z_1), \ldots, (x_n, y_n, z_n)$ value is received and stored in the native, i.e. instrument-dependent coordinate system of the microscope used. For the calibration points $E_1$ to $E_n$ the (X, Y, Z) values in the DICOM coordinate system and after measurement the (x, y, z) values in the native coordinate system are known, so that a transformation rule can be calculated using standard methods for converting instrument-dependent coordinates into the non-instrument-dependent coordinates of the DICOM coordinate system.

The transformation method which comes to mind for the (x, y) coordinates is that of the overdetermined affine transformation. For the transformations of translation, rotation and scaling by a scaling factor which occur in one plane, mathematically at least 2.5, in practice therefore at least 3, reference points (calibration crosses) are needed if all the above-mentioned calibration possibilities are to be taken into account.

The Z zero point of the DICOM coordinate system is on the surface of the slide (without a glass cover). As the native Z coordinates are also included in the calibration described above, the z value can also be converted into the DICOM coordinate system. In the Z calibration, essentially two cases can be distinguished.

If during calibration z values of the surface of the calibration slide increase or decrease in one direction of the (X, Y) plane, the indication is that the calibration slide is not lying precisely horizontally but constitutes a skewed plane inclined in the Z direction. In this case, to increase the accuracy, Z calibration should also be carried out with an approach in the form of an inclined plane, as otherwise the accuracy of the (X, Y) calibration will be reduced. In this case, the deviation Δz can be measured along the gradient of the inclined plane by focussing on the surface of the slide and then the Z calibration can be carried out, for which mathematically at least 1.5 points are needed. For a Z calibration of this kind together with an overdetermined affine transformation in the (X, Y) plane, therefore, at least 4 points (2.5+1.5=4) are needed on the calibration slide.

If, on the other hand, it is established that the z coordinates of some selected reference points on the calibration slide differ from one another without having the form of an inclined plane, a simple transformation rule would be an averaging process, whereby the average is taken of the above-mentioned z coordinates of the reference points and this average value is defined as the zero point in the z direction. In other words, the average value calculated for the z coordinates corresponds to the zero point in the DICOM coordinate system.

It is also conceivable for the two above-mentioned effects to occur in combination.

A calibration slide having at least one reference point with preset reference coordinates in a DICOM coordinate system is proposed for use in the method according to the invention. As already stated, calibration crosses are provided on this calibration slide, constituting the reference points for the method according to the invention. In the DICOM coordinate system the zero point is located on one of the outer corners of the rectangular calibration slide. It is particularly advantageous if the calibration slide corresponds in shape and size to a known type of slide used in microscopy.

For interoperability it is essential that the calibration is carried out on the respective systems (microscopes) using the method according to the invention. The use of identical calibration slides is most suitable for this purpose.

As the system for non-instrument-dependent determination of coordinates of a point to be imaged using a microscope which comprises a unit for determining instrument coordinates $(x_p, y_p, z_p)$ of an imaged point P, the invention provides a computer unit which calculates, from instrument coordinates $(x_1, y_1, z_1)$ of at least one imaged reference point $E_1$ and associated predetermined object-related reference coordinates $(X_1, Y_1, Z_1)$ in a DICOM coordinate system, a transformation rule Φ for converting instrument-dependent coordinates into coordinates of the DICOM coordinate system. The computer unit for calculating the transformation rule may be integrated in the microscope or may be a part of a peripheral computer.

Using this system according to the invention, instrument-dependent coordinates can be converted into non-instrument-dependent coordinates of the DICOM coordinate system. For this, the transformation rule Φ calculated is applied to the coordinates $(x_p, y_p, z_p)$ of an imaged point P and the corresponding coordinates $(X_p, Y_p, Z_p)$ are calculated in the non-instrument-dependent DICOM coordinate system. In order to automate the method according to the invention for calibrating and then calculating non-instrument-dependent coordinates as efficiently as possible, it is useful to implement this method using a computer program which is started up and executed, in particular, on the above-mentioned computer unit of the system according to the invention. The computer program may be stored on data carriers such as CD-ROMs, EEPROMs or in the form of flash memories, or can be downloaded into the working memory through various computer networks, such as Intranet or Internet.

When this computer program is run, for example after a calibration slide with a DICOM coordinate system has been placed on the microscope stage, the reference points applied in the form of calibration crosses are measured (automatically) in the instrument-dependent coordinate system and the corresponding coordinates are determined. After preferably three or more such reference points have been measured, the computer program begins to calculate the transformation rule. Then a sample is examined using the microscope and the instrument coordinates of a point of interest are automatically converted into non-instrument-dependent coordinates of the DICOM coordinate system by the computer program, using the transformation rule.

The computer program can control the entire procedure described, by interaction with the user, or automatically execute particular parts of the method in the form of program modules.

BRIEF DESCRIPTION OF THE DRAWINGS

The invention and its advantages will now be described in more detail with reference to an exemplifying embodiment shown in the drawings.

In the drawings.

DETAILED DESCRIPTION

Figure 1:
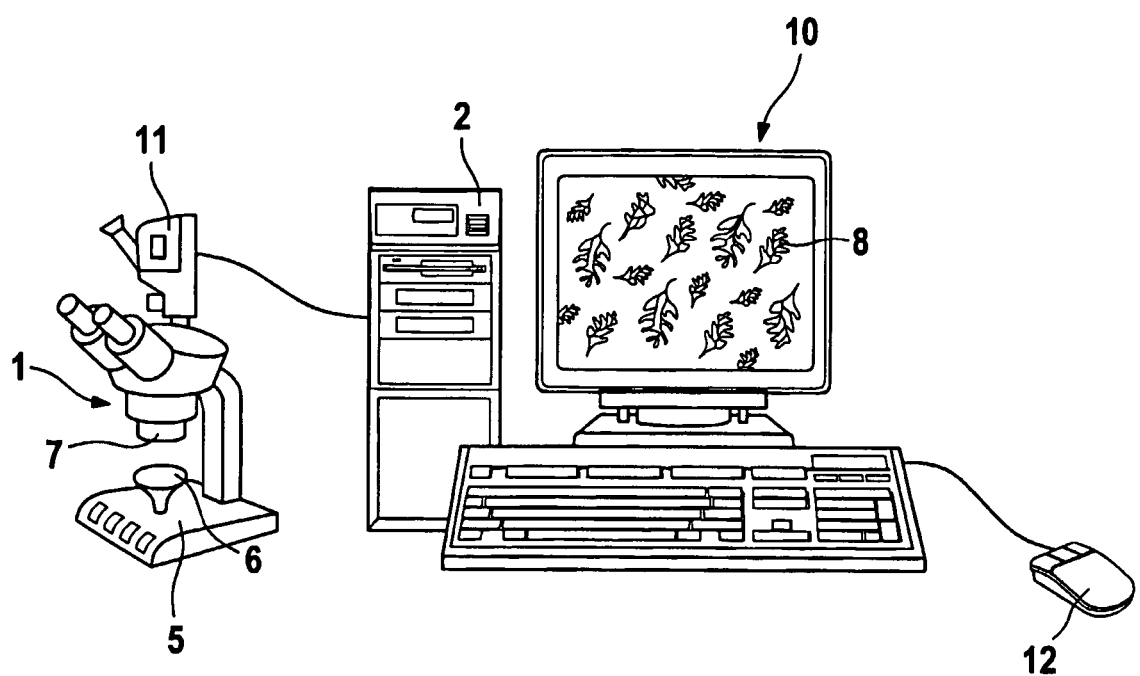
FIG. 1 shows a system according to the invention for the non-instrument-dependent determination of coordinates of a point to be imaged with a microscope, in schematic representation.

FIG. 1 shows, in highly schematic form, a microscope 1 with objective 7 for the enlarged imaging of structures carried on a slide 6. These structures may be cells or collections of cells but may also be industrial structures such as semiconductor structures. Accordingly, the applications of microscopy extend from the medical field (cytology, histology, pathology) into the industrial field (e.g. wafer production or nanotechnology). In these fields it is essential that any conspicuous features or faults in the structures can be marked and retrieved at a later stage or by a different user.

Frequently, a computer unit 2 is connected to the microscope 1 or to a microscope camera 11 in order to allow microscopic images to be further processed and saved. In the interests of simplicity it will be assumed hereinafter that the microscopic images 8 can be viewed on a monitor 10 of the computer unit 2 and that at least part of the unit 4 for determining instrument coordinates (coordinates in the microscopic image) is also present in the computer unit 2.

The slide 6 is often applied to a microscope stage 5 by vacuum suction, the microscope stage 5 generally being adjustable in its three-dimensional position.

The object structures can be examined using a one-shot or a scan.

The image data transmitted from the microscope 1 or from the microscope camera 11 to the computer unit 2 are displayed, in this embodiment, on the monitor 10 of the computer unit 2 in an instrument-dependent coordinate system, while for example by clicking on a particular point in the display image using a mouse 12 the corresponding coordinates of this point can be determined and displayed and saved in the microscope system.

In the present case the computer unit 2 has a computer program which is able to derive a transformation rule Φ from coordinates of one or more imaged reference points and the associated known preset reference coordinates, based on a DICOM coordinate system, on the slide 6, by means of which equipment-dependent coordinates can be converted into coordinates of a DICOM coordinate system (an example of a computer program of this kind can be found at the end of this specification). It is expedient to calibrate the system by using as the slide a calibration slide 3 with at least one reference point in a DICOM coordinate system, in order to calculate the transformation rule using the reference point or points imaged.

The non-equipment-dependent determination of coordinates of an imaged point which constitutes, for example, a fault, a conspicuous feature or an error, is enormously advantageous for reliably retrieving the point. It enables it to be reliably found in spite of tolerances in the same or similar instruments, e.g. during subsequent monitoring using the same instrument or an instrument of the same construction, but also during later examination on different equipment or in remote microscopy (telepathology or remote diagnosis or operations).

Figure 2:
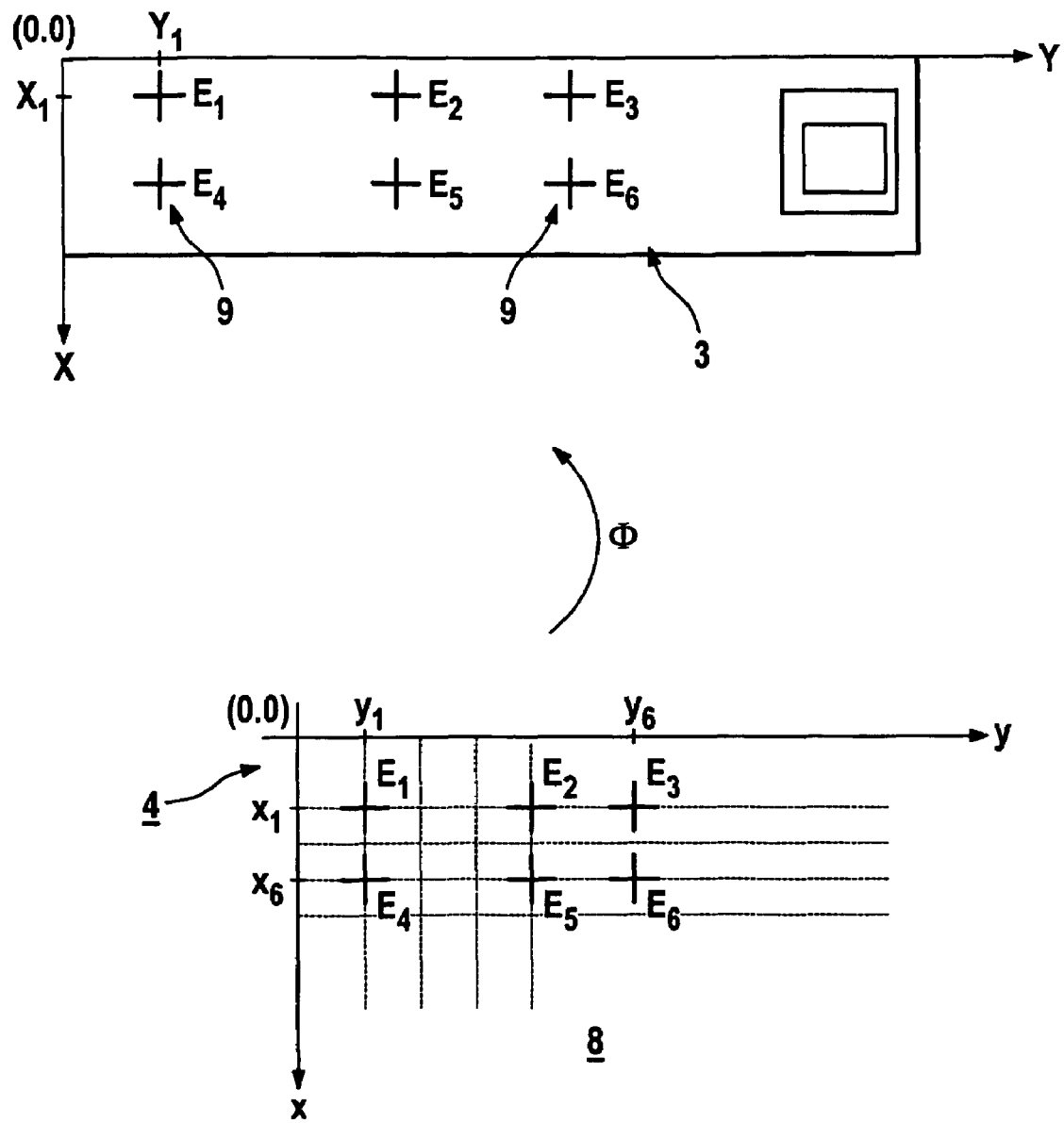
FIG. 2 shows a calibration slide according to the invention and a microscopic image with a schematically shown part of the unit for determining instrument coordinates for calculating the transformation rule Φ.

FIG. 2 shows a calibration slide 3 with DICOM (XY) coordinate system and the associated microscopic image with instrument-dependent (xy) coordinate system. The transformation rule Φ provides the correlation between the two coordinate systems.

The calibration slide 3 according to the invention has six calibration crosses 9 in this embodiment, corresponding to points $E_1$ to $E_6$ in a DICOM coordinate system X, Y, Z, while the zero point is in the top left-hand corner of the calibration slide 3. In the interests of simplicity the Z coordinates will not be considered in the following description. Possible options for the Z calibration are mentioned above in the present description. In order to calibrate the system shown in FIG. 1, first of all the calibration slide 3 is placed on the microscope stage 5 and a microscopic image 8 is produced by means of the microscope 1 and the computer unit 2. The bottom half of FIG. 2 shows a microscopic image 8 of this kind with an instrument-dependent coordinate system x, y, while the corresponding instrument coordinates $(x_1, y_1)$ to $(x_6, y_6)$ at the calibration crosses shown (E1 to E6) can be determined using a unit 4. It should be mentioned that not all six calibration crosses 9 have to be used for the calibration, but fewer calibration crosses may be sufficient depending on the degree of precision required. As described above, however, it is expedient to use three calibration crosses to derive a transformation rule by overdetermined affine transformation.

The method of overdetermined affine transformation (cf. the example at the end of this description) is known per se and will therefore not be described in detail hereinafter. There are also other possible methods known to the skilled man for deriving the transformation rule Φ. The unit 4 for determining instrument coordinates determines the coordinates of a suitable number of imaged calibration crosses, i.e. the corresponding reference points $E_1, E_2, E_3 \ldots$, in the x, y coordinate system. The coordinates of the corresponding calibration crosses 9 (reference points) on the calibration slide 3 in the DICOM XY coordinate system are prescribed. From these, the computer unit 2 or, more accurately, a corresponding computer program running on this computer unit 2, can calculate the transformation rule Φ for converting instrument-dependent coordinates (x, y) into the coordinates (X, Y) of the DICOM coordinate system.

It is useful if calibration slides which correspond to the current slide formats are produced, by means of which associated transformation rules Φ can be calculated, as described above.

Figure 3:
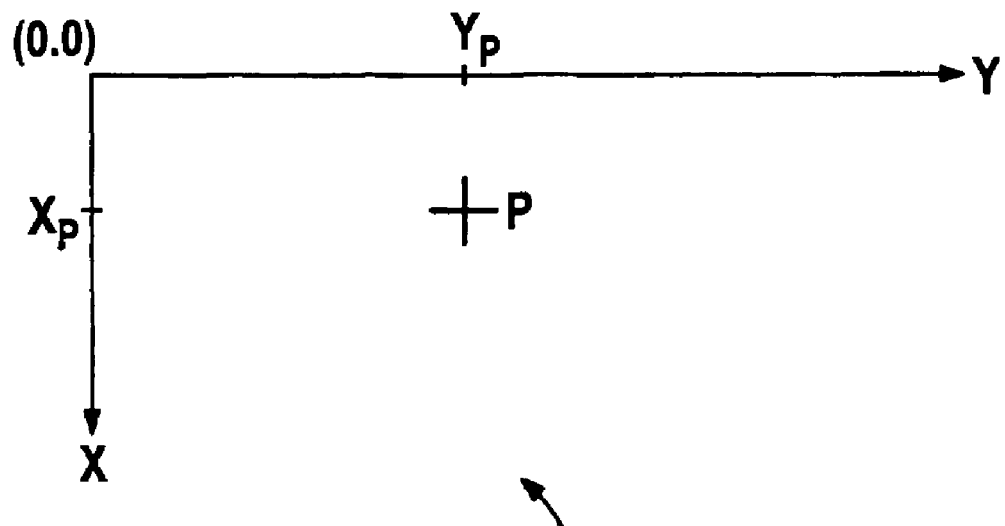
FIG. 3 shows an imaged point P in the instrument-dependent coordinate system and in the DICOM coordinate system.
Figure 3:
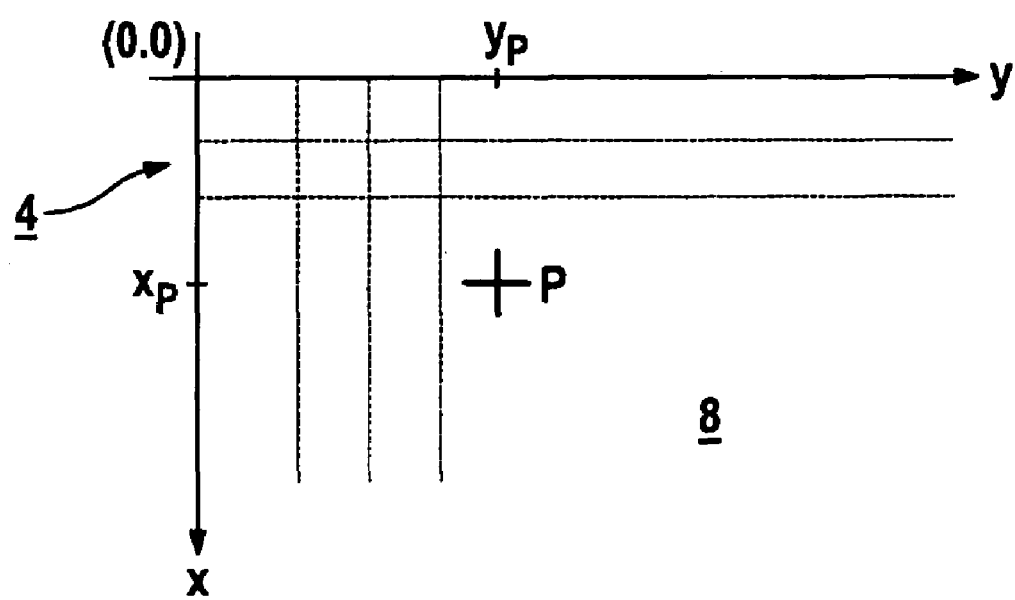

Using the transformation rule Φ discovered, the instrument coordinates $(x_p, y_p)$ of an imaged point P, as shown in FIG. 3, can now be converted into non-instrument-dependent coordinates $(X_p, Y_p)$ of the DICOM coordinate system. The point P may for example represent a conspicuous feature in a cell structure or a fault in a semiconductor structure. The coordinates of the point P are determined by means of the unit 4 for determining instrument coordinates and are converted using the known transformation rule Φ into non-instrument-dependent coordinates of the DICOM coordinate system. For subsequent monitoring or re-examination, the non-instrument-dependent coordinates of the point P together with the specimen are submitted for re-examination. The system in which the re-examination is carried out must, of course, also have a calibration facility for the DICOM coordinate system. In particular, this system has to calculate the associated instrument-dependent coordinates of the point P from the DICOM coordinates supplied for the point P using the inverse transformation rule $\Phi^{-1}$ so that this point can be accessed again in the microscopic image 8.

The following is an example of a computer program written in C programming language, by means of which forward and backward transformation of the coordinates from a native microscope coordinate system and the DICOM coordinate can be carried out using the overdetermined affine transformation method:

```
/*----------------------------------------------------------------*/
// calculation for overdetermined affine transformation
// forward and backward calculation
// coordinate systems are:
//              native microscope-coordinate system, slide-dependent
//              microscope-independent DICOM coordinate system
/*----------------------------------------------------------------*/
#include <stdio.h>
/** Function PROTOTYPES **/
//given: native microscope coordinates, calculate DICOM coordinates void
   CalculateDICOMCoordinates (
double x_Microscope,
double y_microscope,
```

-continued

```
double *pX_DICOM,
double *pY_DICOM
);
// given: DICOM coordinates, calculate native microscope coordinates void
  CalculateNativeMicroscopeCoordinates (
double X_DICOM,
double Y_DICOM,
double *px_Microscope,
double *py_Microscope
);
// calculate coordinate transformation coefficients for forward and back transformation
int CalcForwBackwTransCoefficients(
int NoOfGaugingPoints,
double *x_MicroscopeSystem,
double *y_MicroscopeSystem,
double *x_DICOMSystem,
double *y_DICOMSystem
);
// reset transformation coefficients to default values
  void ResetTransformationCoefficients (void);
  int CalculateTransformation(
  double *a, double *b, double *c,
  double *d, double *e, double *f,
  int NoOfGaugingPoints,
  double *x_Microscope, double *y_Microscope,
  double *x_DICOM, double *y_DICOM
);
 /* static variables for coordinate transformation */
/* forward transformation coefficients */
double aFwd = 1.0;
double bFwd = 1.0;
double cFwd = 0.0;
double dFwd = 1.0;
double eFwd = 1.0;
double fFwd = 0.0;
/* backward transformation coefficients */
double aBwd = 1.0;
double bBwd = 1.0;
double cBwd = 0.0;
double dBwd = 1.0;
double eBwd = 1.0;
double fBwd = 0.0;
int main (void)
{            // coordinates of calibration points E1 to E6 in DICOM and native microscope
system
            double aX_DICOM □ = {3000., 3000., 3000., 17000., 17000., 17000.};
            double aY_DICOM □ = {10000., 30000., 50000, 10000., 30000., 50000.};
            double ax_Microscope □ = {41000., 43000.,45000., 181000., 183000., 185000.};
            double ay Microscope □ = {29400., 309400., 489400., 126600., 306600.,
486600.};
            double xMicTest, yMicTest;
            double XDICTest, YDICTest;
            int i;
            printf ("\n\n");
            printf ("Affin Transformation From Native Microscope To DICOM Coordinate
            System\n");
            printf
            ("=====================================================\n");
            printf ("\n\n");
            printf ("Coordinates of gauging points\n\n");
            for (i=0; i<=5; ++i) {
               printf ("E%d: X-DICOM=%10.1f Y-DICOM=%10.1f x-Mic=%10.1f y-
Mic=%10.1f\n",
               i+1, aXDICOM [i], aY_DICOM [i], axjvlicroscope [i], ay_Microscope [i]);
            printf ("\n\n");
            if (0 == CalcForwBackwTransCoefflcients (6,
               ax_Microscope, ay_Microscope, aX_DICOM, aY_DICOM)){ printf
               ("computation failed\n");
               return 0;
               }
            printf ("forward calculation coefficients\n");
            printf ("-----------------------------\n");
            printf ("X-DICOM = %.4f * x-Mic + %4f * y-Mic + %.4f\n", aFwd.bFwd.cFwd); printf
            ("Y-DICOM = %.4f * x-Mic + %.4f * y-Mic + %.4f\n\n\n", dFwd,eFwd,fFwd);
            printf ("backward calculation coefficients\n");
            printf ("-----------------------------\n\n");
printf ("x-Mic = %.4f * X-DICOM + %.4f * Y-DICOM + %.4f\n", aBwd.bBwd.cBwd);
```

```
        printf ("y-Mic = %.4f * X-DICOM + %.4f * Y-DICOM + %.4f\n\n",
    dBwd.eBwd.fBwd);
                    printf ("Tests of calculation\n");
                    printf ("........................\n\n");
                    printf ("Test1 using microscope coordinates of gauging point E4 as input\n");
                    printf ("\n\n");
                    xMicTest = 181000.;
                    yMicTest = 126600.;
                    printf ("*input*: x Microscope =%10.1f y Microscope=%10.1f\n", xMicTest,
    yMicTest);
                    CalculateDICOMCoordinates (181000., 126600., &XDICTest, &YDICTest);
                    printf ("*** result ***: x DICOM =%10.1f y DICOM =%10.1f\n", XDICTest
    YDICTest);
                    printf ("End of test1 \n\n");
                    printf ("Test2 applying forward and backward transformation to test point\n");
                    printf ("\n\n");
                    xMicTest =100000.;
                    yMicTest = 250000.;
                    printf ("*** input ***: x Microscope =%10.1f y Microscope=%10.1f\n",
    xMicTest, yMicTest);
                    printf ("forward transform\n");
                    CalculateDICOMCoordinates (xMicTest, yMicTest, &XDICTest, &YDICTest);
                    printf ("*" result ***: x DICOM =%10.1f y DICOM =%10.1f\n", XDICTest, YDICTest);
                    printf ("backward transform\n");
                    xMicTest = 0.;
                    yMicTest = 0.;
CalculateNativeMicroscopeCoordinates(XDICTest,YDICTest,
                                                            &xMicTest,
&yMicTest);
printf ("*** result "*: x Microscope =%10.1f y Microscope =%10.1f\n", xMicTest,
    yMicTest);
printf ("End of test2 \n\n");
return 0;
}
/*----------------------------------------------------------*/
        // forward transformation: calculate DICOM coordinates from
        // native microscope coordinates
/*----------------------------------------------------------*/
        void CalculateDICOMCoordinates (
        // input: x,y coordinates in the microscope system
        double x_Microscope,
        double y_Microscope,
        //output: X.Y coordinates in the DICOM System
        double *pX_DICOM,
        double *PY_DICOM
        )
        {
            *pX_DICOM = aFwd * x_Microscope + bFwd * y^Microscope + cFwd;
            *PY_DICOM = dFwd * x_Microscope + eFwd * yMicroscope + fFwd;
        /*-------------------------------------------------------*/
        // back transformation: calculate native microscope-coordinates from DICOM
        // coordinates
        /*----------------------------------------------------------*/
        void CalculateNativeMicroscopeCoordinates(
        // input: X.Y coordinates in the DICOM System
        double X_DICOM,
        double Y_DICOM,
        //output: x,y coordinates in the microscope system
        double *px_Microscope,
        double *py_Microscope
        )
        {
            *px_Microscope = aBwd * X_DICOM + bBwd * Y_DICOM + cBwd;
            *py_Microscope = dBwd * X_DICOM + eBwd * Y_DICOM + fBwd;
        }
        /*=======================================================*/
            int CalcForwBackwTransCoefficients (
            int NoOfGaugingPoints,
            double *x_MicroscopeSystem,
            double *y_MicroscopeSystem,
            double 'x_DICOMSystem,
            double *y_DICOMSystem
        /*=======================================================*/
            if (NoOfGaugingPoints<3) return 0;
            if (0 == CalculateTransformation (&aBwd,&bBwd,&cBwd,&dBwd,&eBwd,&fBwd,
            NoOfGaugingPoints, x_MicroscopeSystem, y_MicroscopeSystem,
                x_DICOMSystem, y_DICOMSystem))
            return 0;
            if (0 == CalculateTransformation (&aFwd,&bFwd,&cFwd,&dFwd,&eFwd,&fFwd,
```

```
            NoOfGaugingPoints, x_DICOMSystem, y_DICOMSystem,
            x_MicroscopeSystem, y_MicroscopeSystem))
        return 0;
        return 1;
}
    /*================================================*/
        void ResetTransformationCoefficients (void)
    /*================================================*/
        /* reset coefficients */
        aFwd = 1.0;
        bFwd = 1.0;
        cFwd = 0.0;
        dFwd = 1.0;
        eFwd = 1.0;
        fFwd = 0.0;
        aBwd = 1.0;
        bBwd = 1.0;
        cBwd = 0.0;
        dBwd = 1.0;
        eBwd = 1.0;
        fBwd = 0.0;
}
    /*================================================*/
        Int CalculateTransformation ( double *a, double *b, double *c,
        double *d, double *e, double *f,
        int NoOfGaugingPoints,
        double *x_Microscope, double *y_Microscope,
        double *x_DICOM, double *y_DICOM
        )
    /*================================================*/
{
        int i;
        double *xDIC, *yDIC, *xMic, *yMic;
double r1, r2, r3, r4, r5, r6, r7, r8; double r9, r10,
r11, r12, r13, r14, r15;
r1 =r2=r3=r4=r5=r6=r7=r8=r13=r14=r15=0.0;
        xDIC = x_DICOM; yDIC =
        y_DICOM; xMic =
        x_Microscope; yMic =
        y_Microscope;
for (i = 0; i < NoOfGaugingPoints; i++)
        {
    r1 += *xDIC;
    r2 += *yDIC;
    r3 += *xDIC * *xDIC; r4 +=
    *yDIC * *yDIC; r5 +=
    *xMic;
    r6 += *xDIC * *yDIC; r7 +=
    *xMic * *yDIC; r8 += *xDIC
    * *xMic++;
    r13 += *yMic;
    r14 += *yDIC++ * *yMic;
    r15+=*xDIC++ **yMic++;
        }
/* accounting of coefficients a, b, c */
        for (i=1; <=2; i++) {
            r9 = r3 * r4 * NoOfGaugingPoints + 2 * r1 * r2 *r6 - r1 * r1 * r4 - r2 * r2 * r3\
            - r6 * r6 'NoOfGaugingPoints;
            /* transformation is singular */
            if (r9 == 0.0)
                    return 0;
            if(i == 2)
            {
                    /* accounting of coefficients d, e, f */
                    r5 = n13;
                    r7 = n14;
                    r8 = n15;
                    }
            r10 = r8 *r4 * NoOfGaugingPoints + r6 * r2 *r5 +r1 * r7 * r2 -\
                                        r1 * r4 * r5 - r8 * r2 * r2 - r6 * r7 *
NoOfGaugingPoints;
                r11 = r3 *r7 * NoOfGaugingPoints + r8 * r2 *r1 +r1 * r6 * r5 - ri * ri * r7 - r3 * r2\
                                        * r5 - r8 * r6 *
                    NoOfGaugingPoints ; r12 = r3 *r4 * r5 + r6 * r7 *r1 +r8 * r6 * r2 \
                                        - r8 * r4 * ri - r5 * r6 * r6 - r3 * r7 * r2;
            r10 = r10/r9;
            r11 = r11/r9;
            r12/=r9;
            if(i==1 )
```

```
            {
            *a = r10; *b = r11; *c = r12;
            }
        else
            {
            *d = r10; *e = r11; *f = r12;
                }
            }
        return 1;
    }
}
/*=================== End (end of file)===================*/
```

The following text shows a printout as generated by the above program when six calibration points E1 to E6 are preset and then two tests are carried out. The first test (Test1) carries out a back-transformation into the DICOM coordinate system for calibration point E4, whereas the second test (Test2) carries out forward and back transformation of a given test point (P):

Affine Transformation from Native Microscope to DICOM Coordinate System

Coordinates of gauging points

E1: X-DICOM=3000.0 Y-DICOM=10000.0
        x-Mic=41000.0 y-Mic=129400.0

E2: X-DICOM=3000.0 Y-DICOM=30000.0
        x-Mic=43000.0 y-Mic=309400.0

E3: X-DICOM^ 3000.0 Y-DICOM=50000.0
        x-Mic=45000.0 y-Mic=489400.0

E4: X-DICOM=17000.0 Y-DICOM=10000.0
        x-Mic=181000.0 y-Mic=126600.0

E5: X-DICOM=17000.0 Y-DICOM=30000.0
        x-Mic=183000.0 y-Mic=306600.0

E6: X-DICOM=17000.0 Y-DICOM=50000.0
        x-Mic=185000.0 y-Mic=486600.0 forward calculation coefficients $X$-DICOM=0.1000*$x$-Mic+−0.0011*$y$-Mic+−955.3433

$Y$-DICOM=0.0022*$x$-Mic+0.1111*$y$-Mic+−4465.6743 backward calculation coefficients $x$-Mic=10.0000*$X$-DICOM+0.1000*$Y$-DICOM+10000.0000

$y$-Mic=−0.2000*$X$-DICOM+9.0000*$Y$-DICOM+40000.0000

Tests of calculation

Test1 using microscope coordinates of gauging point E4 as input

* input *: x Microscope = 181000.0 y Microscope= 126600.0 * result *: x DICOM = 17000.0 y DICOM = 10000.0

End of test1

Test2 applying forward and backward transformation to test point

* input *: x Microscope = 100000.0 y Microscope= 250000.0
forward transform
* result *: x DICOM = 8764.7 y DICOM = 23528.1 backward transform

*result*: x Microscope=100000.0 y Microscope=250000.0

End of test2

The printout of the above text produced by the program is reproduced below in German (as far as possible) for ease of understanding:

Affine Transformation vom nativen Mikroskop-zum DICOM Koordinatensystem

Koordinaten der Eichpunkte

E1: X-DICOM=3000.0 Y-DICOM=10000.0
        x-Mic=41000.0 y-Mic=129400.0

E2: X-DICOM=3000.0 Y-DICOM=30000.0
        x-Mic=43000.0 y-Mic=309400.0

E3: X-DICOM=3000.0 Y-DICOM=50000.0
        x-Mic=45000.0 y-Mic=489400.0

E4: X-DICOM=17000.0 Y-DICOM=10000.0
        x-Mic=181000.0 y-Mic=126600.0

E5: X-DICOM=17000.0 Y-DICOM=30000.0
        x-Mic=183000.0 y-Mic=306600.0

E6: X-DICOM=17000.0 Y-DICOM=50000.0
        x-Mic=185000.0 y-Mic=486600.0

Berechnungskoeffizienten für Hintransformation $X$-DICOM=0.1000*$x$-Mic+−0.0011*$y$-Mic+−955.3433

$Y$-DICOM=0.0022*$x$-Mic+0.1111*$y$-Mic+−4465.6743

Berechnungskoeffizienten für Rücktransformation $x$-Mic=10.0000*$X$-DICOM+0.1000*$Y$-DICOM+10000.0000 $y$-Mic=−0.2000*$X$-DICOM+9.0000*$Y$-DICOM+40000.0000

Berechnungstests

Test1 unter Verwendung der Mikroskopkoordinaten des Eichpunktes E4 als Eingabe

*Eingabe*: x Microscope=181000.0 y Microscope=126600.0

*Ergebnis*: x DICOM=17000.0 y DICOM=10000.0

Ende des Test1

Test2 mit Hin-und Rücktransformation des Testpunktes

*Eingabe*: x Microscope=100000.0 y Microscope=250000.0 Hintransformation

*Ergebnis*: x DICOM =8764.7 y DICOM =23528.1 Rücktransformtion

Ergebnis***: x Microscope=100000.0 y Microscope=250000.0

Ende des Test2

LIST OF REFERENCE NUMERALS

1 Microscope
2 Computer unit
3 Calibration slide
4 Unit for determining instrument coordinates
5 Microscope stage
6 Slide
7 Objective
8 Microscopic image
9 Calibration crosses, points on slide
10 Monitor
11 Camera
12 (Computer) mouse
P Imaged point
Φ Transformation rule
X, Y, Z Coordinates in the DICOM coordinate system, reference coordinates
x, y, z Coordinates in the microscope system, instrument coordinates
$E_1, \ldots, E_6$ Calibration crosses, points, reference points

The invention claimed is:

1. A method for non-instrument-dependent determination of coordinates of a point imaged using a microscope, the method comprising:
   determining, at object-related reference coordinates of at least one imaged reference point in a Digital Imaging and Communications in Medicine coordinate system, corresponding first instrument coordinates of the at least one imaged reference point in an instrument-dependent coordinate system;
   determining, using the object-related reference coordinates and the corresponding first instrument coordinates, a transformation rule for converting instrument-dependent coordinates into corresponding coordinates of the Digital Imaging and Communications in Medicine coordinate system; and then
   converting, using the transformation rule, second instrument coordinates of an imaged point into non-instrument-dependent coordinates of the Digital Imaging and Communications in Medicine coordinate system.

2. The method as recited in claim 1 further comprising presetting the reference coordinates using a calibration slide.

3. The method as recited in claim 2 wherein the calibration slide corresponds to a first type of microscope slide.

4. The method as recited in claim 2 further comprising providing the calibration slide based on a first type of microscope slide.

5. The method as recited in claim 1 wherein the determining the transformation rule is performed using an over-determined affine transformation.

6. The method as recited in claim 1 wherein the determining the transformation rule is performed using an over-determined affine transformation for x, y coordinates of the instrument-dependent coordinates.

7. The method as recited in claim 1 wherein the determining the transformation rule is performed using at least one of an averaging and an inclined plane approach.

8. The method as recited in claim 1 wherein the determining the transformation rule is performed using at least one of an averaging and an inclined plane approach for a z coordinate of the instrument-dependent coordinates.

9. A calibration slide comprising at least one reference point with preset reference coordinates in a Digital Imaging and Communications in Medicine coordinate system, the preset reference coordinates being usable to determine corresponding first instrument coordinates of the at least one reference point when the at least one reference point is imaged by a microscope so as to enable the determining of a transformation rule for converting instrument-dependent coordinates into corresponding coordinates of the Digital Imaging and Communications in Medicine coordinate system.

10. The calibration slide as recited in claim 9 wherein the slide has a shape and a size corresponding to a type of microscope slide.

11. A system for non-instrument-dependent determination of coordinates of a point to be imaged using a microscope, the system comprising:
   a coordinate-determination unit configured to determine instrument coordinates of an imaged point; and
   a computer unit configured to calculate, from first instrument coordinates of at least one imaged reference point and associated predetermined object-related reference coordinates in a Digital Imaging and Communications in Medicine coordinate system, a transformation rule for converting instrument-dependent coordinates into coordinates of the Digital Imaging and Communications in Medicine coordinate system.

12. The system as recited in claim 11 wherein the computer unit is configured to calculate, from the instrument coordinates of the imaged point using the calculated transformation rule, corresponding non-instrument-dependent coordinates in the Digital Imaging and Communications in Medicine coordinate system.

13. A computer readable medium having stored thereon computer executable process steps operative to perform a method for non-instrument-dependent determination of coordinates of a point imaged using a microscope, the method comprising:
   determining, at object-related reference coordinates of at least one imaged reference point in a Digital Imaging and Communications in Medicine coordinate system, corresponding first instrument coordinates of the at least one imaged reference point in an instrument-dependent coordinate system;
   determining, using the object-related reference coordinates and the corresponding first instrument coordinates, a transformation rule for converting instrument-dependent coordinates into corresponding coordinates of the Digital Imaging and Communications in Medicine coordinate system; and then converting, using the transformation rule, second instrument coordinates of an imaged point into non-instrument-dependent coordinates of the Digital Imaging and Communications in Medicine coordinate system.

14. The computer readable medium as recited in claim 13 wherein the computer executable process steps are executable by a computer unit of a system for non-instrument-dependent determination of coordinates of a point to be imaged using a microscope, the system comprising the computer unit and a coordinate-determination unit configured to determine instrument coordinates of an imaged point, the computer unit being configured to calculate, from first instrument coordinates of at least one imaged reference point and associated predetermined object-related reference coordinates in a Digital Imaging and Communications in Medicine coordinate system, a transformation rule for converting instrument-dependent coordinates into coordinates of the -Digital Imaging and Communications in Medicine coordinate system.

* * * * *